US007630396B2

(12) United States Patent
Goto et al.

(10) Patent No.: US 7,630,396 B2
(45) Date of Patent: Dec. 8, 2009

(54) MULTICHANNEL SIGNAL CODING EQUIPMENT AND MULTICHANNEL SIGNAL DECODING EQUIPMENT

(75) Inventors: Michiyo Goto, Tokyo (JP); Chun Woei Teo, Singapore (SG); Sua Hong Neo, Singapore (SG); Koji Yoshida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 237 days.

(21) Appl. No.: 11/573,100

(22) PCT Filed: Aug. 24, 2005

(86) PCT No.: PCT/JP2005/015375

§ 371 (c)(1),
(2), (4) Date: Mar. 16, 2007

(87) PCT Pub. No.: WO2006/022308

PCT Pub. Date: Mar. 2, 2006

(65) Prior Publication Data

US 2007/0233470 A1 Oct. 4, 2007

(30) Foreign Application Priority Data

Aug. 26, 2004 (JP) ............................ 2004-247404

(51) Int. Cl.
*H04J 15/00* (2006.01)

(52) U.S. Cl. ...................................... 370/464; 704/208

(58) Field of Classification Search ....................... None
See application file for complete search history.

(56) References Cited

U.S. PATENT DOCUMENTS

| | | | | |
|---|---|---|---|---|
| 5,091,946 | A * | 2/1992 | Ozawa | 704/208 |
| 5,651,090 | A | 7/1997 | Moriya et al. | |
| 5,758,316 | A | 5/1998 | Oikawa et al. | |
| 5,812,971 | A | 9/1998 | Herre | |
| 5,890,108 | A * | 3/1999 | Yeldener | 704/208 |
| 6,061,649 | A * | 5/2000 | Oikawa et al. | 704/226 |
| 7,155,385 | B2 * | 12/2006 | Berestesky et al. | 704/215 |
| 2005/0226426 | A1 | 10/2005 | Oomen et al. | |
| 2005/0254446 | A1 | 11/2005 | Breebaart | |
| 2006/0100861 | A1 | 5/2006 | Breebaart et al. | |

FOREIGN PATENT DOCUMENTS

| | | |
|---|---|---|
| EP | 714173 | 5/1996 |
| EP | 0797324 | 9/1997 |

(Continued)

OTHER PUBLICATIONS

U.S. Appl. No. 11/574,783 to Yoshida, filed Mar. 6, 2007.

*Primary Examiner*—William Trost, IV
*Assistant Examiner*—Mewale Ambaye
(74) *Attorney, Agent, or Firm*—Greenblum & Bernstein P.L.C.

(57) ABSTRACT

Multichannel signal coding equipment is provided for presenting a high quality sound at a low bit rate. In the multichannel signal coding equipment (2), a down mix part (10) generates monaural reference channel signals for N number of channel signals. A coding part (11) codes the generated reference channel signal. A signal analyzing part (12) extracts parameters indicating characteristics of each of the N number of channel signals. An MUX part (13) multiplexes the coded reference channel signal with the extracted parameters.

6 Claims, 9 Drawing Sheets

1

FOREIGN PATENT DOCUMENTS

| | | |
|---|---|---|
| JP | 5-056007 | 3/1993 |
| JP | 7-336234 | 12/1995 |
| JP | 8-095599 | 4/1996 |
| JP | 10-051313 | 2/1998 |
| WO | 1995/034956 | 12/1995 |
| WO | 03/090208 | 10/2003 |

* cited by examiner

MULTICHANNEL SIGNAL CODING EQUIPMENT AND MULTICHANNEL SIGNAL DECODING EQUIPMENT

TECHNICAL FIELD

The present invention relates to multichannel signal coding equipment and multichannel signal decoding equipment, and more particularly to multichannel signal coding equipment and multichannel signal decoding equipment used in a system that transmits multichannel speech signals and audio signals.

BACKGROUND ART

General speech codec is achieved by coding the monaural presentation of the speech only. In general, such monaural codec is used in communication equipment (such as mobile telephone and teleconference equipment) where signals are obtained from a single source such as a human voice. While previously this was sufficient for this type of monaural signal as well due to the limitations of the transmission bandwidth and processing speed of the digital signal processor (DSP), advances in technology have improved the bandwidth, making speech quality an important factor that required further consideration. As a result, the shortcomings related to monaural speech became apparent. One example of the shortcomings of monaural speech is failure to provide spatial information (such as sound imaging and caller location). An example of an application wherein the location identification of the caller is useful is high-quality multi-speaker teleconference equipment that identifies the location of the caller under conditions where multiple callers exist simultaneously. Spatial information is realized by presenting speech using multichannel signals. In addition, speech is preferably provided at as low a bit rate as possible.

In comparison to speech coding, audio coding is generally performed by multichannel coding. The multichannel coding of audio coding sometimes utilizes cross-correlation redundancy between channels. For example, for stereo (in other words, two-channel) audio signals, cross-correlation redundancy is realized based on the concept of joint stereo coding. Joint stereo refers to stereo technology that combines middle-side (MS) stereo mode and intensity (I) stereo mode. By using these modes in combination, a better data compression rate is achieved and the coding bit rate is reduced.

However, with MS stereo, when coding is performed at a low bit rate, aliasing distortion readily occurs and signal stereo imaging is affected as well. In addition, while I stereo is useful in high frequency bands where the resolution of the frequency component of the human auditory system decreases, it is not always useful in low frequency bands. General speech codec is viewed as coding (parametric coding) that functions by modeling based on parameters human vocal tract using a type of linear prediction, making the application of joint stereo coding unsuitable for speech codec.

On the other hand, in comparison to audio coding, speech coding has not been sufficiently studied with respect to multichannel coding. An example of a conventional apparatus that encodes multichannel signals during speech codec is the apparatus described in Patent Document 1. The basic concept of the technology disclosed in this document involves the presentation of speech signals using parameters. More specifically, the used band is divided into multiple frequency bands (called sub-bands) and the parameters are calculated for each sub-band. An example of a calculated parameter is the interchannel level difference, i.e., the power ratio between the left (L) channel and right (R) channel. The interchannel level difference is used to correct the spectral coefficient on the decoding side.

Patent Document 1: International Publication No. 03/090208 (Pamphlet)

DISCLOSURE OF THE INVENTION

Problems to be Solved by the Invention

Nevertheless, the above-mentioned conventional apparatus requires one interchannel level difference for each sub-band. In consequence, the same interchannel level difference is applied as the modification coefficient for all spectral coefficients in a sub-band. That is, because common parameters are used in the sub-bands, the problem arises that fine level adjustment cannot be performed on the decoding side.

It is therefore an object of the present invention to provide multichannel signal coding equipment and multichannel signal decoding equipment for presenting high-quality speech at a low bit rate.

Means for Solving the Problem

The multichannel signal coding equipment of the present invention employs a configuration having generation means for generating a channel reference signal for the signals of multiple channels, coding means for coding the generated reference signal, extraction means for extracting parameters indicating the characteristics of each of the signals of the multiple channels, and multiplexing means for multiplexing the coded reference signal with the extracted parameters.

The multichannel signal decoding equipment of the present invention employs a configuration having demultiplexing means for demultiplexing a channel reference signal which is a coded reference signal for the signals of multiple channels and the parameters multiplexed with the reference signal that indicate the characteristics of each of the signals of the multiple channels, decoding means for decoding the demultiplexed reference signal, and generation means for generating the signals of the multiple channels from the parameters demultiplexed from the decoded reference signal.

The multichannel signal transmission system of the present invention employs a configuration having multiplexing means for multiplexing a channel reference signal which is a coded reference signal for the signals of multiple channels with the parameters indicating the characteristics of each of the signals of the multiple channels, and demultiplexing means for demultiplexing the multiplexed reference signal and parameters.

The multichannel signal coding method of the present invention comprises a generation step for generating a channel reference signal for the signals of multiple channels, a coding step for coding the generated reference signal, an extraction step for extracting parameters indicating the characteristics of each of the signals of the multiple channels, and a multiplexing step for multiplexing the coded reference signal with the extracted parameters.

The multichannel signal decoding method of the present invention comprises a demultiplexing step for demultiplexing a channel reference signal which is a coded reference signal for the signals of multiple channels and the parameters multiplexed with the reference signal that indicate the characteristics of each of the signals of the multiple channels, a decoding step for decoding the demultiplexed reference signal, and a generation step for generating the signals of the multiple channels from the parameters demultiplexed from the decoded reference signal.

ADVANTAGEOUS EFFECT OF THE INVENTION

The present invention presents high-quality speech at a low bit rate.

BEST MODE FOR CARRYING OUT THE INVENTION

Now an embodiment of the present invention will be described in detail with reference to the accompanying drawings.

Embodiment 1

Figure 1:
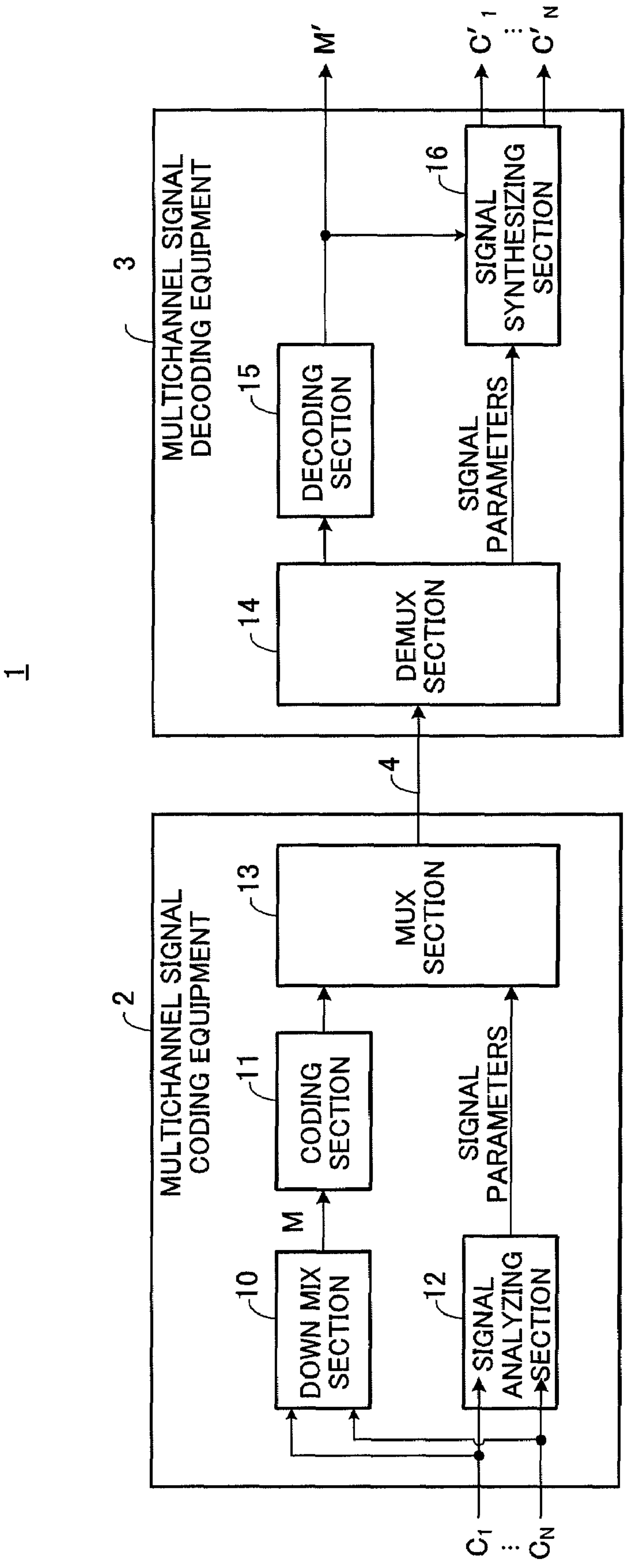
FIG. 1 is a block diagram showing the configuration of the multichannel signal transmission system according to an embodiment of the present invention.

FIG. 1 is a block diagram showing the configuration of the multichannel signal transmission system according to an embodiment of the present invention. Multichannel signal transmission system 1 comprises multichannel signal coding equipment 2 that encodes the signals of N (where N is an integer greater than or equal to 2) channels, multichannel signal decoding equipment 3 that decodes the signals of N channels (herein after "N channel signals"), and transmission path 4 that transmits the signal obtained by multichannel signal coding equipment 2 to multichannel signal decoding equipment 3.

Multichannel signal coding equipment 2 comprises down mix section 10 that down mixes N channel signals and obtains a monaural reference signal (herein after "reference channel signal"), coding section 11 that encodes the reference channel signal, signal analyzing section 12 that analyzes each of the N channel signals, extracts the parameters indicating the characteristics of each of the N channel signals, and obtains the extracted parameter set, and MUX section 13 that multiplexes the coded reference channel signal and obtained parameter set and transmits the result to multichannel signal decoding equipment 3 via transmission path 4. Furthermore, the reference channel signal is a signal outputted as a monaural signal (speech signal or audio signal) upon decoding by multichannel signal decoding equipment 3 and is referred at the time the N channel signals are decoded.

Figure 2:
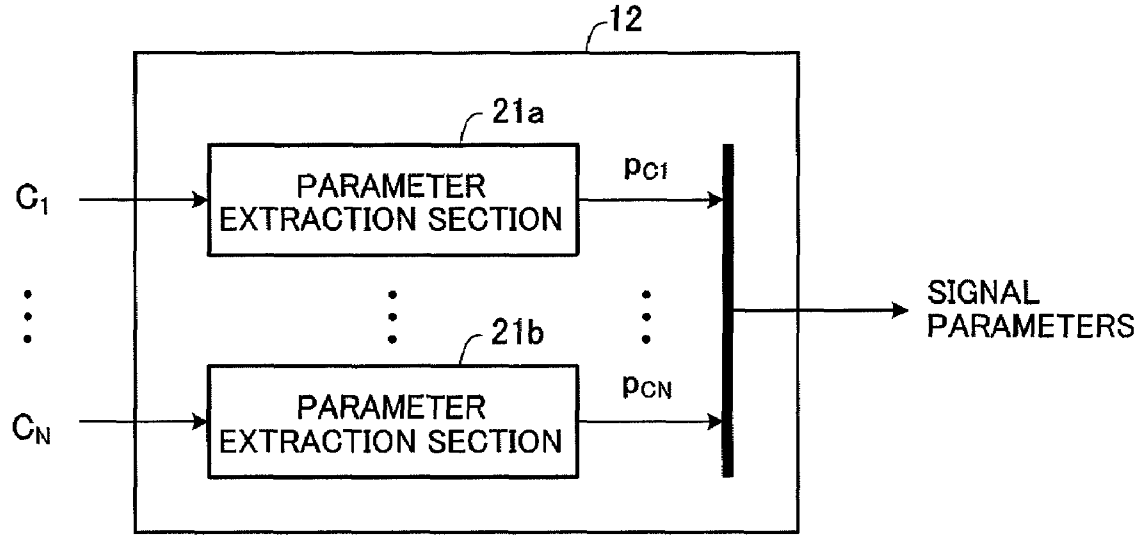
FIG. 2 is a block diagram showing the configuration of the signal analyzing section according to an embodiment of the present invention.

In multichannel coding equipment 2, as shown in FIG. 2, signal analyzing section 12 comprises N number of parameter extraction sections 21 corresponding to each N channel. Parameter extraction section 21 extracts the parameters from each of the N channel signals. Furthermore, to clarify the configuration, FIG. 2 shows only parameter extraction section 21*a* corresponding to channel 1 and parameter extraction section 21*b* corresponding to channel N.

Figure 3:
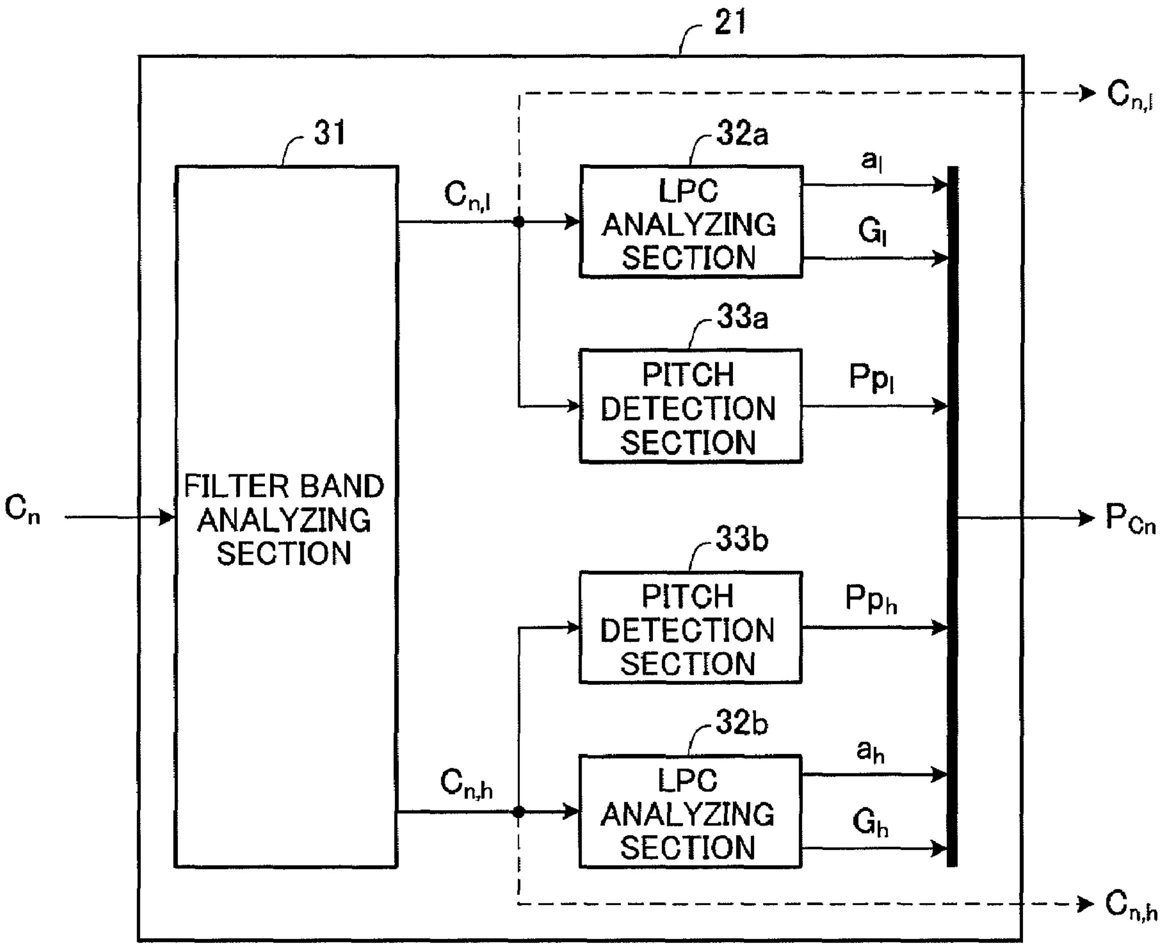
FIG. 3 is a block diagram showing the configuration of the parameter extraction section according to an embodiment of the present invention.

Parameter extraction section 21, as shown in FIG. 3, comprises filter band analyzing section 31 that demultiplexes the signals of channel n (where n is an integer greater than or equal to 1 and less than or equal to N) into multiple frequency bands (in the present embodiment, two frequency bands: high band and low band), LPC analyzing section 32*a* that performs linear predictive coding (LPC) analysis on high band signal components to obtain the LPC coefficient and LPC gain, LPC analyzing section 32*b* that performs LPC analysis on low band signal components to obtain the LPC coefficient and LPC gain, pitch detection section 33*a* that detects the pitch period of high band signal components, and pitch detection section 33*b* that detects the pitch period of low band signal components.

Now FIG. 1 will be referred to once again. Multichannel signal decoding equipment 3 comprises DEMUX section 14 that receives signals transmitted from multichannel signal coding equipment 2 via transmission path 4 and demultiplexes the reference channel signal and parameters, decoding section 15 that decodes the demultiplexed reference channel signal, and signal synthesizing section 16 that generates N channel signals using the decoded reference channel signal and demultiplexed parameters (herein after, for the decoding side, each of the N channels is referred to as "target channel" and the N channel signals as "N target channel signals").

Figure 4:
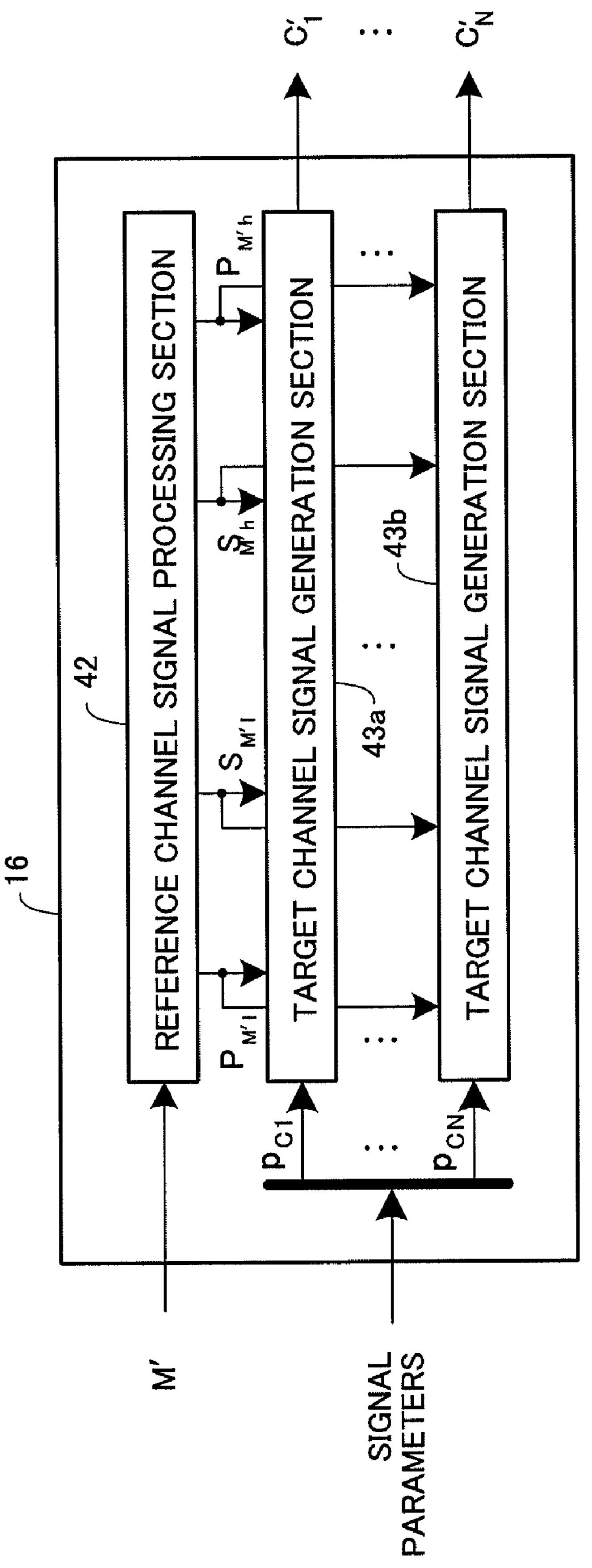
FIG. 4 is a block diagram showing the configuration of the signal synthesizing section according to an embodiment of the present invention.

Signal synthesizing section 16, as shown in FIG. 4, comprises reference channel signal processing section 42 that processes the decoded reference channel signal and obtains the power spectrum of the reference channel signal and the spectrum value in frequency domain (herein after simply "spectrum value") of the reference channel signal, and N number of target channel signal generation sections 43 established for each of the N target channels that generates N target channel signals based on the demultiplexed parameters and obtained power spectrum and spectrum value. Furthermore, to clarify the configuration, FIG. 4 shows only target channel signal generation section 43*a* corresponding to target channel 1 and target channel signal generation section 43*b* corresponding to target channel N.

Figure 5:
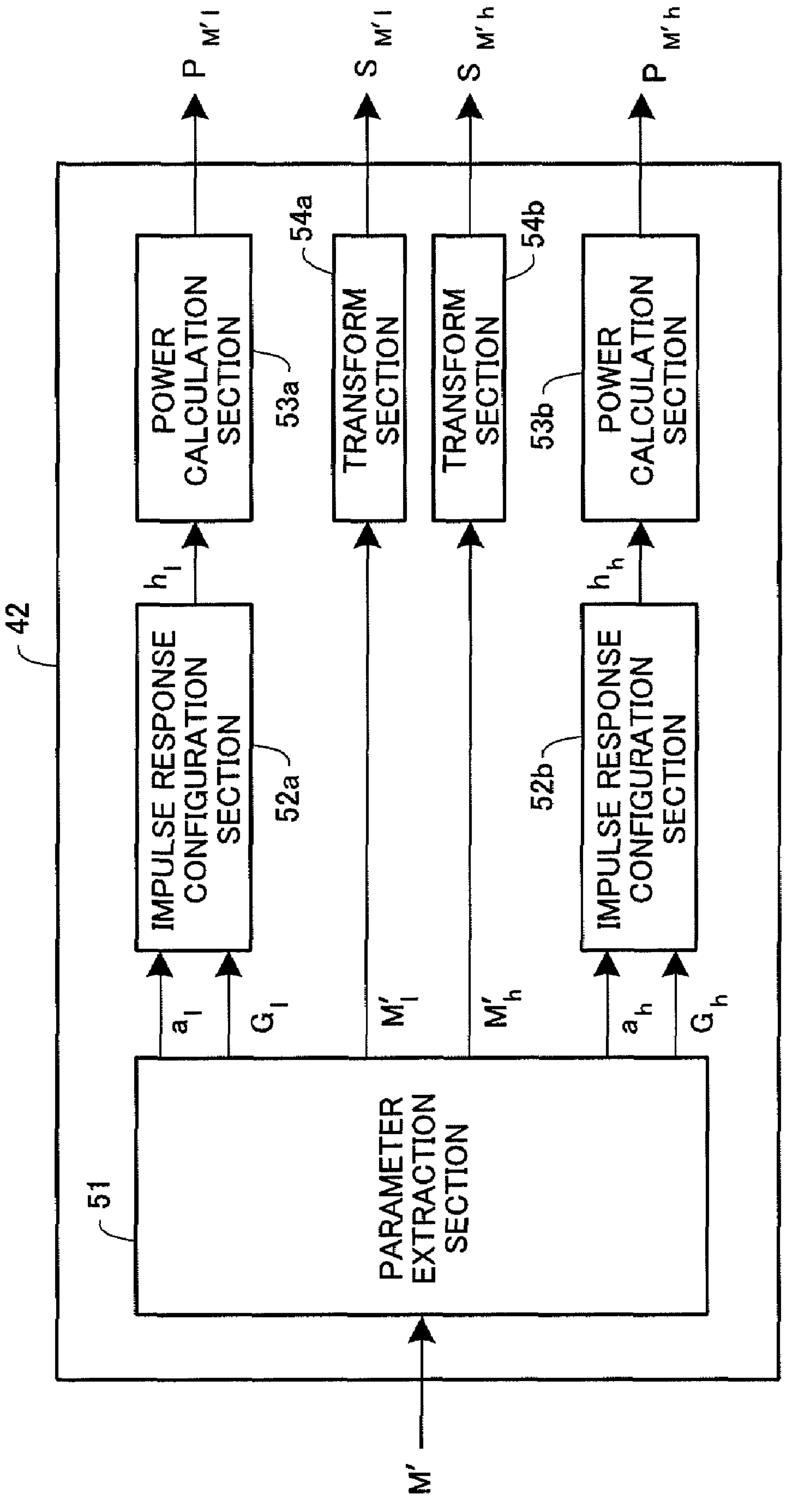
FIG. 5 is a block diagram showing the configuration of the reference channel signal processing section according to an embodiment of the present invention.

Reference channel signal processing section 42, as shown in FIG. 5, comprises parameter extraction section 51 that demultiplexes the decoded reference channel signal into multiple frequency bands (in the present embodiment, two frequency bands: high band and low band) to obtain multiple signal components and obtains as parameters indicating the characteristics of the reference channel signal the LPC coefficients and LPC gain of the high band signal components and the LPC coefficients and LPC gain of the low band signal components, impulse response configuration sections 52*a* and 52*b* that configure the impulse response based on the parameters of each high band and low band signal component, power calculation sections 53*a* and 53*b* that calculate the power for the configured impulse response of each high band and low band signal component and obtains the power spectrum of each high band and low band signal component, and transform sections 54*a* and 54*b* that transform each high band and low band signal component to a signal of the frequency domain.

Figure 6:
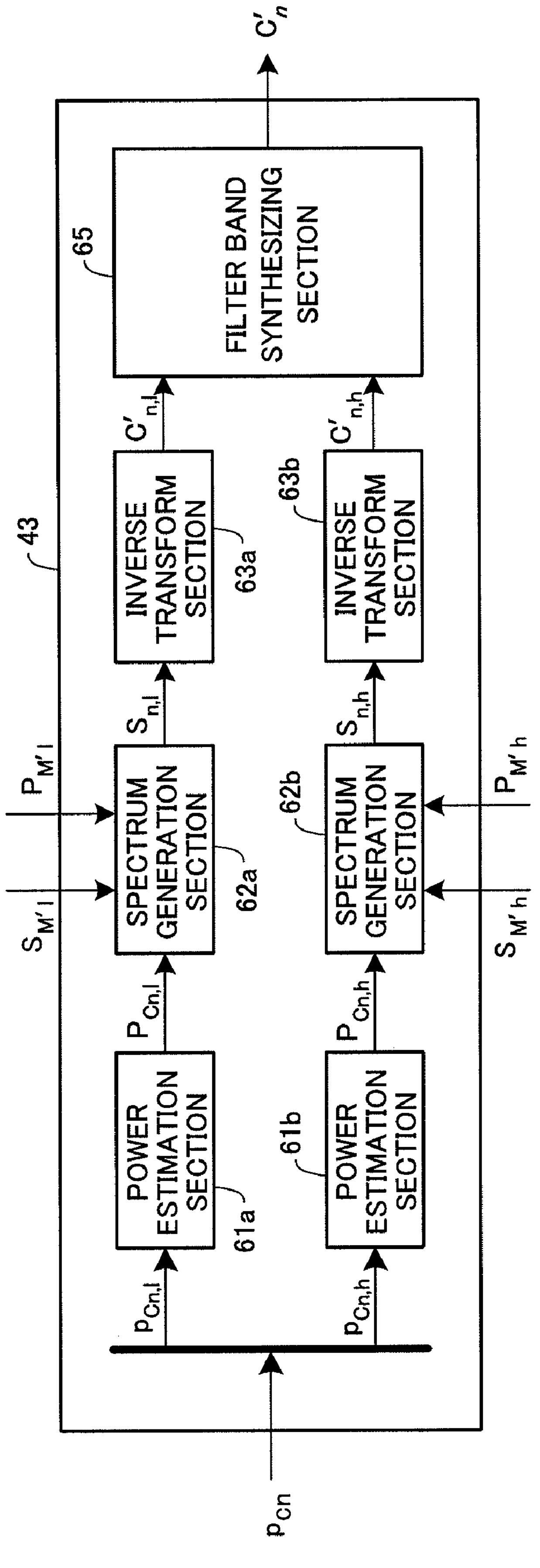
FIG. 6 is a block diagram showing the configuration of the target channel signal generation section according to an embodiment of the present invention.

Target channel signal generation section 43, as shown in FIG. 6, comprises power estimation sections 61*a* and 61*b* that estimate each power spectrum of the high band components and low band components of the number n target channel signal (herein after "n target channel signal") based on the multiple signal component parameters (in the present embodiment, high band signal parameters and low band signal parameters) obtained by demultiplexing the parameters of target channel n, spectrum generation sections 62*a* and 62*b* that generate each spectrum value of the high band components and low band components of the n target channel signal, inverse transform sections 63*a* and 63*b* that inversely transform each spectrum value of the high band components and low band components of the n target channel signal to a time domain signal, and filter band synthesizing section 65 that synthesizes each inversely transformed high band component and low band component spectrum value. The combination of the above-mentioned power calculation sections 53*a* and 53*b* and power estimation sections 61*a* and 61*b* constitute the power spectrum estimation means.

Figure 7:
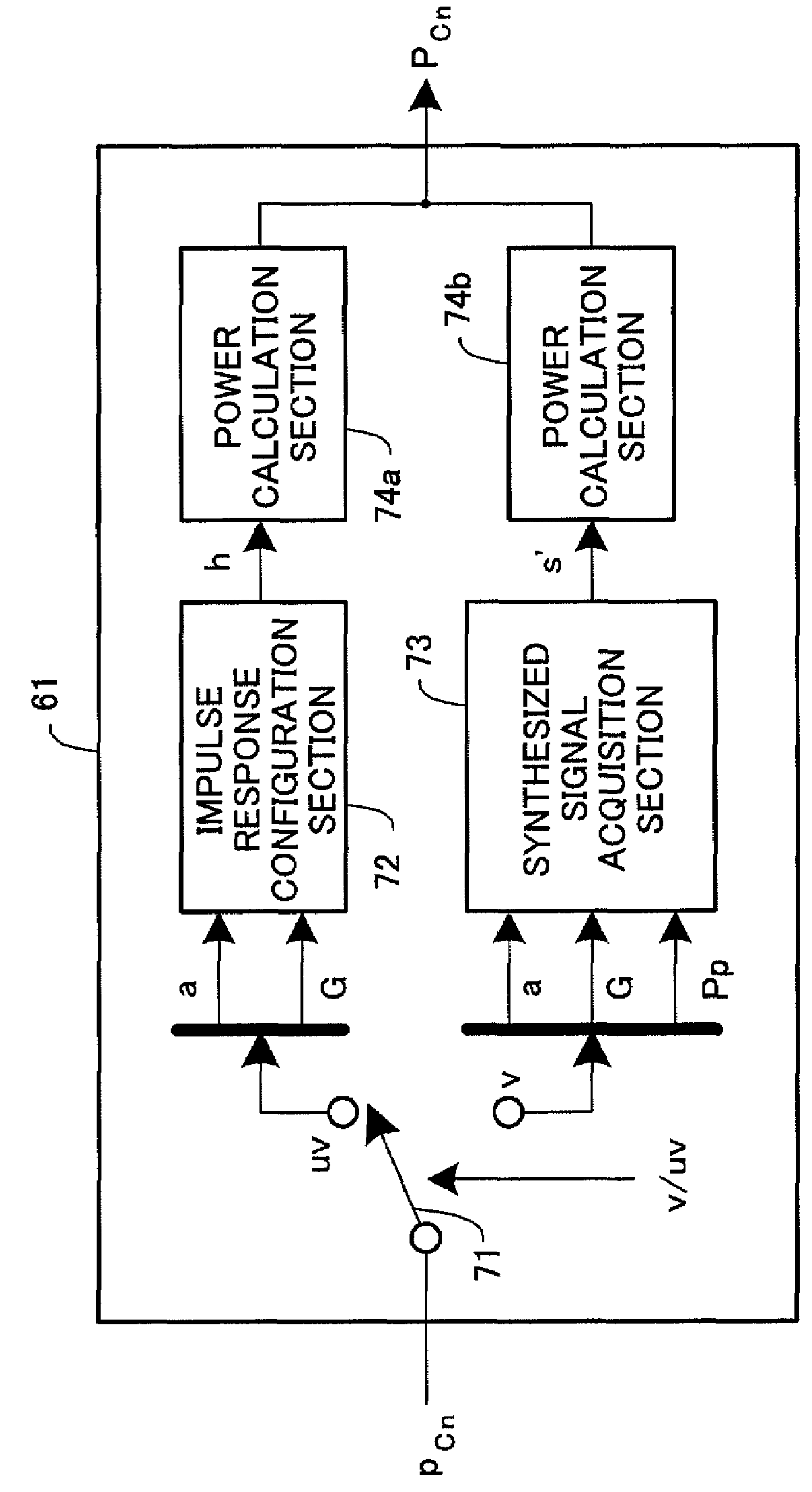
FIG. 7 is a block diagram showing the configuration of the power estimation section of the target channel signal generation section according to an embodiment of the present invention.

Power estimation section 61 (here generally termed power estimation section 61 since power estimation sections 61*a* and 61*b* of FIG. 6 comprise the same internal configuration), as shown in FIG. 7, comprises classification section 71 that classifies the signal of the channel corresponding to the inputted parameters as a voiced signal or unvoiced signal for each frame, impulse response configuration section 72 that configures the impulse response based on the parameters of the signal classified as an unvoiced signal, synthesized signal acquisition section 73 that obtains a synthesized signal based on the parameters of the signal classified as a voiced signal, power calculation section 74*a* that calculates the power using the configured impulse response and obtains the power spectrum of the n target channel signal, and power calculation section 74*b* that calculates the power using the obtained synthesized signal and obtains the power spectrum of the n target channel signal.

Figure 8:
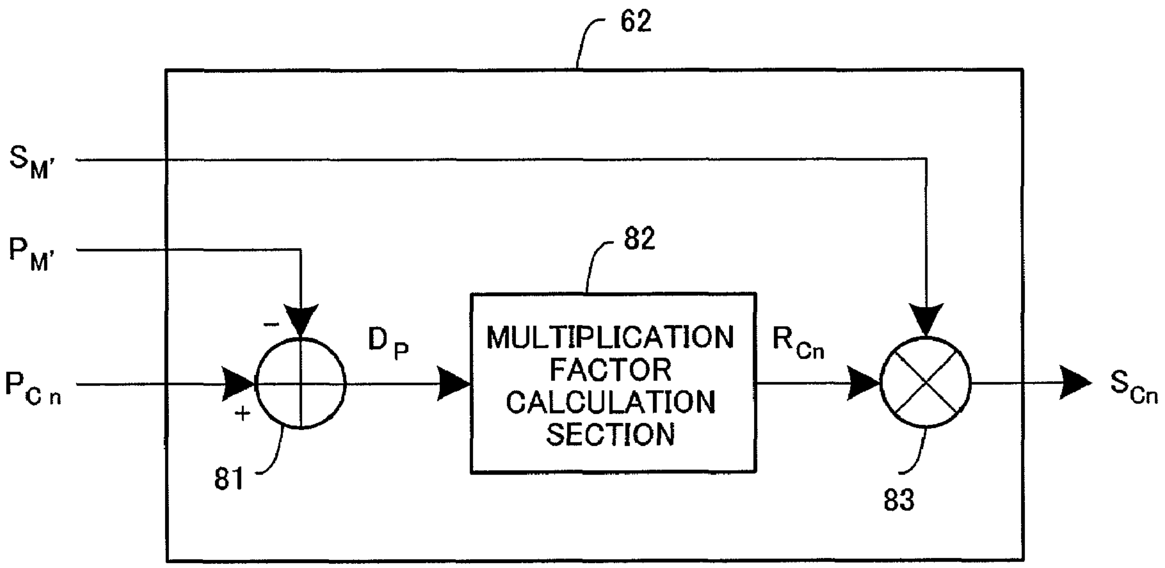
FIG. 8 is a block diagram showing the configuration of the spectrum generation section according to an embodiment of the present invention.

Spectrum generation section 62 (here generally termed spectrum generation section 62 since spectrum generation sections 62*a* and 62*b* of FIG. 6 comprise the same internal configuration), as shown in FIG. 8, comprises subtraction section 81 that subtracts the power spectrum identified for the reference channel signal from the power spectrum identified for the target channel n to obtain the power spectrum difference, multiplication factor computation section 82 that computes based on the power spectrum difference the multiplication factor to be applied to the spectrum value of the reference channel signal, and multiplication factor multiplication section 83 that multiplies the reference channel signal by the multiplication factor.

Figure 9:
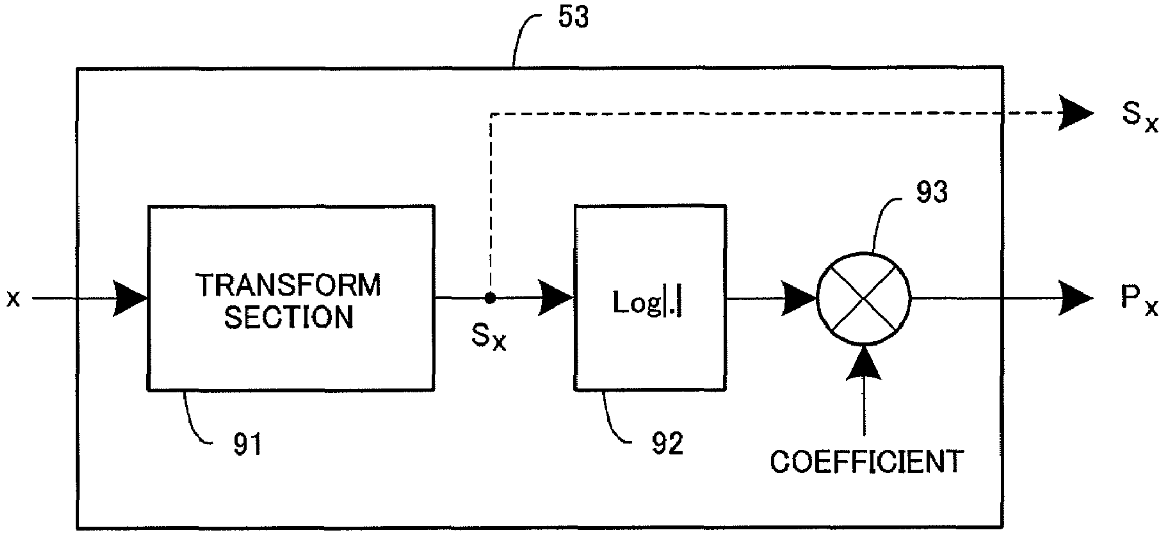
FIG. 9 is a block diagram showing the configuration of the power calculation section of the reference channel signal processing section according to an embodiment of the present invention.

Power calculation section 53 (here generally termed power calculation section 53 since power calculation sections 53*a* and 53*b* of FIG. 5 comprise the same internal configuration), as shown in FIG. 9, comprises transform section 91 that transforms the input signal from the corresponding impulse response configuration section 52*a* or 52*b* to a signal of the frequency domain, logarithm calculation section 92 that calculates the logarithm for the transformed signal, and coefficient multiplication section 93 that multiples the logarithm calculation result by the established coefficient.

Next, the operation of the multichannel signal transmission system comprising the above-mentioned configuration will be described.

N channel signals $C_1$ to $C_N$ are mixed in down mix section 10 to generate the monaural reference channel signal M. Reference channel signal M is expressed by the following equation (1). Furthermore, the N channel signals $C_1$ to $C_N$ are converted to digital format by the A/D converter not shown in the figures. The following series of processes is executed for each frame.

$$M = \frac{1}{N}\sum_{n=1}^{N} C_n \tag{1}$$

The reference channel signal M is coded by coding section 11, which is an existing or new speech coding apparatus or audio coding apparatus, and a monaural bit stream is obtained. At the same time, in signal analyzing section 12, the N channel signals $C_1$ to $C_N$ are analyzed and the signal parameters of each channel are extracted. The output from coding section 11 and the signal parameters from signal analyzing section 12 are multiplexed in MUX section 13 and transmitted as a single bit stream.

On the decoding side, this bit stream is demultiplexed into a monaural bit stream and signal parameters in DEMUX section 14. The monaural bit stream is decoded in decoding section 15 and the reconstructed reference channel signal M' is obtained. Decoding section 15 supports the reverse processing of coding section 11 used on the coding side. The decoded monaural reference channel signal M' is combined with the signal parameters of each target channel in signal synthesizing section 16 and used as a reference signal to generate or synthesize each of the target channel signals $C'_1$ to $C'_N$.

In signal analyzing section 12, the parameters $p_{C1}$ to $p_{CN}$ of each of the channel signals $C_1$ to $C_N$ are extracted. In FIG. 2, each of the channel signals $C_1$ to $C_N$ is filtered and analyzed in parameter extraction section 21 to obtain a series of parameters $p_{Cn}$. For example, channel $C_1$ is processed in parameter extraction section 21*a* to obtain parameter $p_{C1}$. This process is executed for all channels until channel N is similarly processed in parameter extraction section 21*b* and parameters $P_{CN}$ are obtained. All of the parameters $P_{Cn}$ of each channel constitute the signal parameters generated on the coding side.

Parameter extraction is applied to each of the channel signals $C_n$. The inputted channel signal $C_n$ is demultiplexed in the two bands, a low band and a high band, by generating the low band signal $C_{n,l}$ and the high band signal $C_{n,h}$ in filter band analyzing section 31. In an alternate method, a low pass filter and a high pass filter are used to demultiplex the signals into two bands. Low frequency signal $C_{n,l}$ is analyzed using LPC analyzing section 32*a*, which is an LPC analyzing filter, to obtain the LPC parameters. These parameters are LPC coefficient $a_{k,l}$ and LPC gain $G_l$. In pitch detection section 33*a* that uses the pitch period detection algorithm generally known in speech coding, the pitch period $P_{pl}$ is obtained. The high band signal $C_{n,h}$ is also analyzed in the LPC analyzing section 32b, which is an LPC analyzing filter, and the pitch detection section 33b to obtain the LPC coefficient $a_{k,h}$, LPC gain $G_h$ and pitch period $P_{ph}$ as one more PLC parameter set. These parameters constitute the inputted parameters $p_{Cn}$ of the channel signal $C_n$. In addition, parameter extraction section 21 may optionally output low band signal $C_{n,l}$ and high band signal $C_{n,h}$ for use in a process of the signal synthesizing section 16, for example.

The signal parameters, i.e., parameters $p_{C1}$ to $p_{Cn}$, are multiplexed with the coded reference channel signal M in MUX section 13 to form a bit stream to be transmitted to the decoding side.

On the decoding side, the received bit stream is demultiplexed into the coded monaural bit stream and signal parameters in DEMUX section 14. The coded monaural bit stream is decoded in decoding section 15 to obtain the reference channel signal M'.

In signal synthesizing section 16, the reference channel signal M' and the parameters $p_{C1}$ to $p_{CN}$ demultiplexed from the monaural bit stream are used to generate or synthesize N number of target channel signals $C'_1$ to $C'_N$. During the generation of target channel signals $C'_1$ to $C'_N$, the reference channel signal M' spectrum value and power spectrum need to be calculated in reference channel signal processing section 42. The low band power spectrum $P_{M'1}$ and spectrum value $S_{M'1}$, and the high band power spectrum $P_{M'h}$ and spectrum value $S_{M'h}$ are calculated. These calculation results are used along with parameters $p_{C1}$ to $p_{CN}$ in the target channel signal generation section 43 to generate or synthesize the N target channel signals $C'_1$ to $C'_N$. The generation of the target channel signals $C'_1$ to $C'_N$ will be described herein after.

FIG. 5 shows the preferred calculation method for the above-mentioned power spectrum and spectrum value. For the input signal, i.e., reference channel signal M', the signal parameters indicating the characteristics of the reference channel signal M' are calculated via parameter extraction section 51. Parameter extraction returns the low band and high band signal parameters and the low band and high band signal values. The parameters for the low band are LPC coefficient $a_l$ and LPC gain $G_l$. This parameter extraction method is the same as the method described for parameter extraction section 21 but the processing target of parameter extraction section 51 is the reference channel signal M' where the processing target of parameter extraction section 21 is the N channel signals $C_1$ to $C_N$. In consequence, the parameters extracted by parameter extraction section 21 and parameter extraction section 51 are sometimes different values and sometimes the same values.

In addition, similar parameters are extracted for the high band. These are LPC coefficient $a_h$ and LPC gain $G_h$. The low band signal parameters are used in the impulse response configuration section 52a to configure the low band impulse response $h_l$ that indicates the signal characteristics of the low band signals. Then, the low band signal impulse response $h_l$ is used to calculate the estimated value of the low band power spectrum $P_{M'l}$ in power calculation section 53a. Low band signal $M'_1$ is transformed in transform section 54a to obtain the low band spectrum value $S_{M'l}$, which is the frequency presentation of the low band time signal. Similarly, the high band signal parameters configure the high band impulse response $h_h$ that indicates the signal characteristics of the high band signals in impulse response configuration section 52b. The high band signal impulse response $h_h$ is also similarly used to calculate the estimated value of the high band power spectrum $P_{M'h}$ in power calculation section 53b. The high band signal $M'_h$ is transformed in transform section 54b to obtain the high band spectrum value $S_{M'h}$, which is the frequency presentation of the high band time signals.

The method used to calculate the power spectrum of the signals is shown in FIG. 9, which is the input of this process, may be the impulse response of the function or the actual time domain signal. That is, the calculation method shown in FIG. 9 can be applied not only to power calculation section 53 but also to power calculation sections 74a and 74b. The input signal x is transformed in transform section 91 to obtain the equivalent presentation of the frequency domain. This is referred to as the frequency component or spectrum value $S_x$. To calculate the power $P_x$, in logarithm calculation section 92, the logarithm value of each absolute spectrum value is calculated using equation (2) and, in coefficient multiplication section 93, the coefficient "20" is multiplied by the logarithm value using equation (3). The calculated spectrum value $S_x$ may be returned as optional output for use in another process.

$$S_x(z)=FT\{x(n)\} \tag{2}$$

$$P_x(z)=20\log_{10}|S_x(z)| \tag{3}$$

When the input signal x is the impulse response h expressed by equation (4), transform section 91 returns the transfer function H. That is, $S_x$=H. The transfer function H can be expressed by equation (5).

$$h(n)=\sum_{k=1}^{P}a_k h[n-k]+G\delta(n) \tag{4}$$

$$H(z)=FT\{x(n)\}=FT\{h(n)\}=\frac{G}{1-\sum_{k=1}^{P}a_k z^{-k}} \tag{5}$$

Then, the logarithmic amplitude of transfer function H is taken in logarithm calculation section 92 and multiplied by the coefficient "20" in coefficient calculation section 93, enabling estimation of the power spectrum $P_x$ of the signals. This series of calculations can be expressed by equation (6).

$$P_x(z)=20\log_{10}|H(z)| \tag{6}$$

That is, the power spectrum of the signals can be estimated from the transfer function of the signal derived from LPC coefficient a and gain G.

Figure 10:
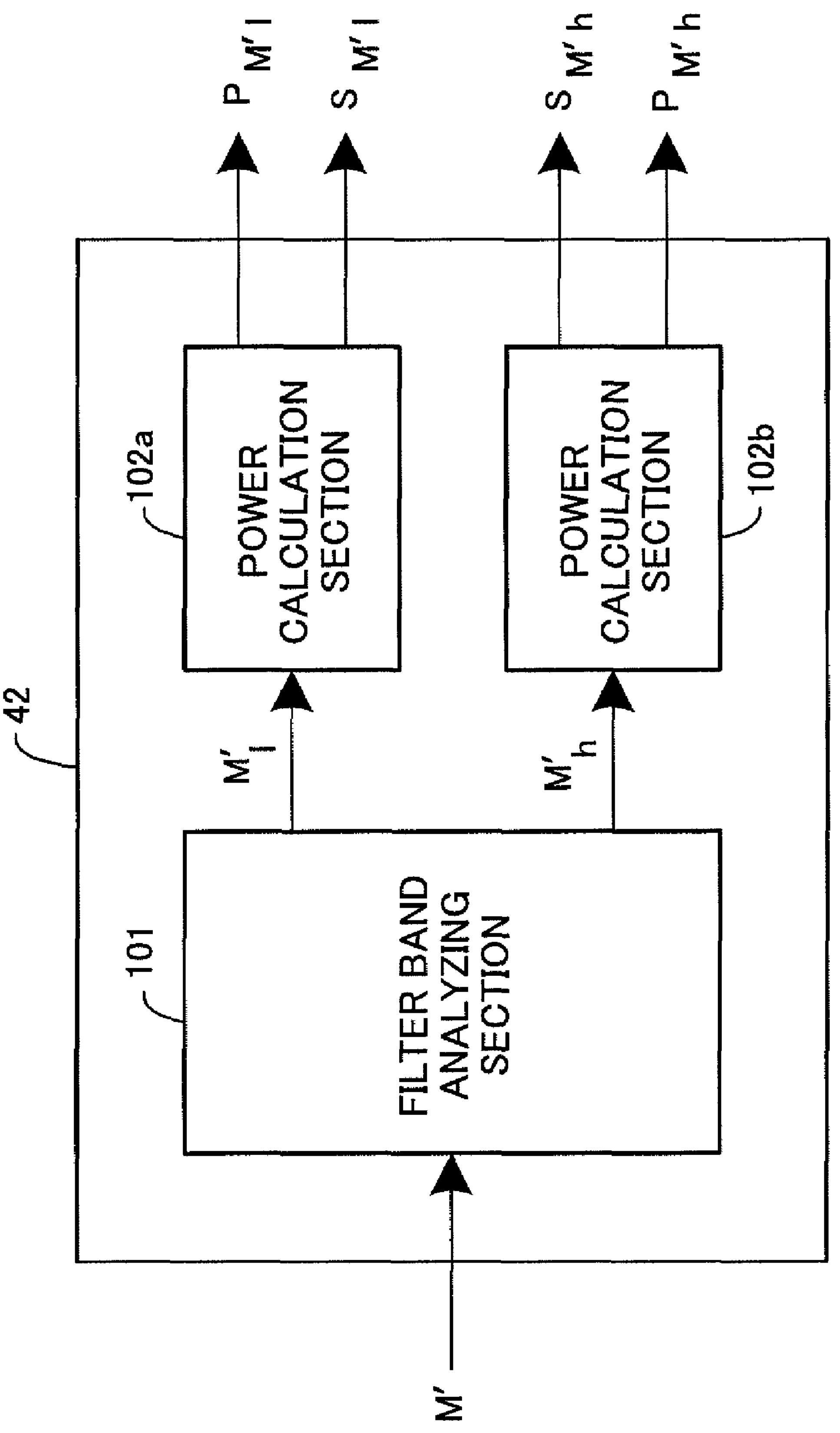
FIG. 10 is a block diagram showing a variation of the configuration of the reference channel signal processing section according to an embodiment of the present invention.

Here, an alternate method for the calculation of the power spectrum and spectrum value described using FIG. 5 will be described. FIG. 10 is a block diagram showing a variation of the configuration of reference channel signal processing section 42. In reference channel signal processing section 42 of FIG. 10, rather than estimating the signal spectrum using LPC parameters, an actual signal is used for signal power spectrum calculation. The reference channel signal M', which is an input signal, is demultiplexed in filter band analyzing section 101 into two bands: low band signal $M'_l$ and high band signal $M'_h$. In the low band, power spectrum $P_{M'l}$ and spectrum value $S_{M'l}$ are returned according to the power calculation of power calculation section 102a and, in the high band, power spectrum $P_{M'h}$ and spectrum value $S_{M'h}$ are returned according to the power calculation of power calculation section 102b.

Thus, the spectrum value $S_{M'}$ and power spectrum $P_{M'}$ of reference channel signal M' are estimated using the method shown in either FIG. 5 or FIG. 10. That is, a sample of the inputted reference channel signal M' is subjected to time-frequency transform using equation (7) to obtain spectrum value $S_{M'}$.

$$S_{M'}=FT\{M'\} \tag{7}$$

In addition, the square of the logarithmic amplitude of the signal of the frequency domain is taken by performing the calculation of equation (8) for sample of the inputted reference channel signal M'. As a result, the power spectrum $P_{M'}$ is obtained.

$$P_{M'}=10\log(M'^2)=20\log(|M'|) \tag{8}$$

More preferably, the calculation is switched according to whether or not the inputted sample is zero or not zero. For example, when the inputted sample is not zero, calculation based on equation (8) is performed, and when the inputted value is zero, the power spectrum $P_{M'}$ is set to zero.

Then, in target channel signal generation section 43, as shown in FIG. 6, the n target channel signal $C'_n$ is generated. The input to target channel signal generation section 43 is the low band power spectrum $P_{M'l}$, high band power spectrum $P_{M'h}$, low band signal spectrum value $S_{M'l}$ and the high band signal spectrum value $S_{M'h}$ of the reference channel signal M', and the parameters $p_{Cn}$. The parameters $p_{Cn}$ include the low band parameters $p_{Cn,l}$ and the high band parameters $p_{Cn,h}$. In each band, the following calculation is performed.

First, in power estimation sections 61*a* and 61*b*, the power spectrums $p_{Cn,l}$ and $p_{Cn,h}$ of each band are estimated using the parameters $p_{Cn,l}$ and $p_{Cn,h}$ which include LPC parameters and the pitch period. Then, in spectrum generation sections 62*a* and 62*b*, the calculated power spectrums $p_{Cn,l}$ and $p_{Cn,h}$ of each band are used in combination with the power spectrums $P_{M'l}$ and $P_{M'h}$ and spectrum values $S_{M'l}$ and $S_{M'h}$ of each band of the reference channel to generate the spectrum values $S_{n,l}$ and $S_{n,h}$ of each band of the target channel n. The generated spectrum values $S_{n,l}$ and $S_{n,h}$ are inversely transformed by inverse transform sections 63*a* and 63*b* to obtain the corresponding signals $C'_{n,l}$ and $C'_{n,h}$ in the time domain. The time domain signals from each band are synthesized in filter band synthesizing section 65 to obtain the n target channel signal $C'_n$, which is the time domain signal.

Here, the above-mentioned power spectrum estimation will be described in detail with reference to FIG. 7. In classification section 71 provided in power estimation section 61, each frame of the signal corresponding to the inputted parameters is classified as a voiced signal v or unvoiced signal uv. In other words, the signal is classified as either stationary or non-stationary. The voiced/unvoiced detection of classification section 71 is based on the pitch period value of the pitch period $P_p$ That is, if the pitch period $P_p$ is not zero, the stream is classified as voiced signal v. Or, if the pitch period $P_p$ is not zero, the stream is classified as a steady signal or quasi-steady signal. On the other hand, if the pitch period $P_p$ is zero, the stream is classified as unvoiced signal uv. Or, if the pitch period $P_p$ is zero, the stream is classified as an unsteady signal. Using pitch period Pp to indicate the voiced or unvoiced status eliminates the need to send an extra information bit for such indication, thereby reducing the amount of information bits transmitted.

For the frames classified as unvoiced signals, the power spectrum $P_{Cn}$ is calculated using LPC coefficient a and gain G in the same manner as described with reference to FIG. 5. That is, in the impulse response configuration section 72, the impulse response h is configured using the LPC coefficient a and gain G. In the power calculation section 74*a*, the power spectrum $P_{Cn}$ is calculated using the impulse response h.

For frames classified as voiced signals, LPC coefficient a, gain G, and pitch period $P_p$ are used. In synthesized signal acquisition section 73, the synthesized signal s' is synthesized using a method generally known as speech synthesizing in the field of speech coding. Then, in power calculation section 74*b*, the power spectrum $P_{Cn}$ of synthesized signal s' is calculated.

When the power spectrum is estimated using only the impulse response, only the envelope curve of the power spectrum exists in the estimation result, and not the peak of the power spectrum. However, particularly in the case of speech signals, the peak of the power spectrum is extremely critical for maintaining an accurate pitch in the output signal. In the present embodiment, the pitch period $P_p$ is used in the power spectrum estimation for the voiced section, enabling improvement of power spectrum estimation accuracy.

Next, the above-mentioned spectrum generation will be described in detail. After the reference channel power spectrum $P_{M'}$ and target channel power spectrum $P_{Cn}$ are obtained, the power spectrum difference $D_p$ between the power spectrum $P_{Cn}$ and reference channel power spectrum $P_{M'}$ is calculated in subtraction section 81 using equation (9).

$$D_P=P_{Cn}-P_{M'} \tag{9}$$

More preferably, the calculation is switched according to whether or not the inputted reference channel signal M' sample is zero or not zero. For example, when the inputted sample is not zero, calculation based on equation (9) is performed, and when the inputted value is zero, the power spectrum difference $D_P$ is set to zero.

Then, the power spectrum difference $D_P$ is converted in multiplication factor calculation section 82 to multiplication factor $R_{Cn}$ expressed by equation (10) as the spectrum value. When the inputted sample is zero, the multiplication factor $R_{Cn}$ is "1".

$$R_{Cn}=10^{\frac{D_P}{20}} \tag{10}$$

Then, in multiplication factor calculation section 83, the spectrum value $S_{M'}$ of the reference channel signal M' is scaled based on multiplication factor $R_{Cn}$, and the target channel spectrum value $S_{Cn}$ is obtained.

$$S_{Cn}=R_{Cn}\times S_{M'} \tag{11}$$

Then, the low band spectrum value $S_{n,l}$ of spectrum value $S_{Cn}$ is inversely transformed to the signal $C'_{n,l}$ of the time domain in inverse transform section 63*a*, and the high band spectrum value $S_{n,h}$ of the spectrum value $S_{Cn}$ is inversely transformed to the signal $C'_{n,h}$ of the time domain in inverse transform section 63*b*. Signals $C'_{n,l}$ and $C'_{n,h}$ are synthesized in filter band synthesizing section 65 to obtain the n target channel signal $C'_n$.

In this manner, according to the present embodiment, the monaural reference channel signal M for N channel signals and the signal parameters indicating the characteristics of each of the N channel signals are obtained and multiplexed on the coding side. In addition, the reference channel signal M' obtained by the decoding of the reference channel signal M and the signal parameters are demultiplexed and, based on the result, N channel signals are generated as N target channel signals on the decoding side. As a result, the coding bit rate is decreased, the power spectrum $P_{Cn}$ that approximates the energy distribution for each channel can be estimated on the decoding side and, based on approximated energy distribution of each channel and the reference channel signal M', the N channel signal $C_n$, the source signal, can be restored as the N target channel signal $C'_n$, thereby presenting high-quality speech at a low bit rate. In addition, because the signal parameters and reference channel signal M' transmitted via transmission path 4 are multiplexed, the overall system is capable of transmitting from the transmitter side signals that present high-quality speech at a low bit rate to the receiver side, thereby enabling the presentation of high-quality speech at a low bit rate.

In addition, according to the present embodiment, the multiplication factor $R_{Cn}$ applied to the reference signal is calculated for each of the N channels based on the power spectrum $P_{Cn}$ and the power spectrum $P_{M'}$ and, by simply multiplying the calculated multiplication factor $R_{Cn}$, by the spectrum value $S_{M'}$ of the reference channel signal M', a multichannel effect is achieved.

Furthermore, according to the present embodiment, the signals are demultiplexed into two frequency bands, a high band and a low band, but the bandwidth of each band does not need to be equal. In an applicable assignment example, the low band is set to 2 to 4 KHz and the remaining bandwidth is assigned to the high band.

In addition, in the present embodiment, the parameters of each band, that is the LPC coefficient, LPC gain, and pitch period, are extracted. An LPC filter of an order that differs for each band may be applied, according to the characteristics of the signals of each band. In this case, the order of the LPC filter can also be included in signal parameters.

Figure 11A:
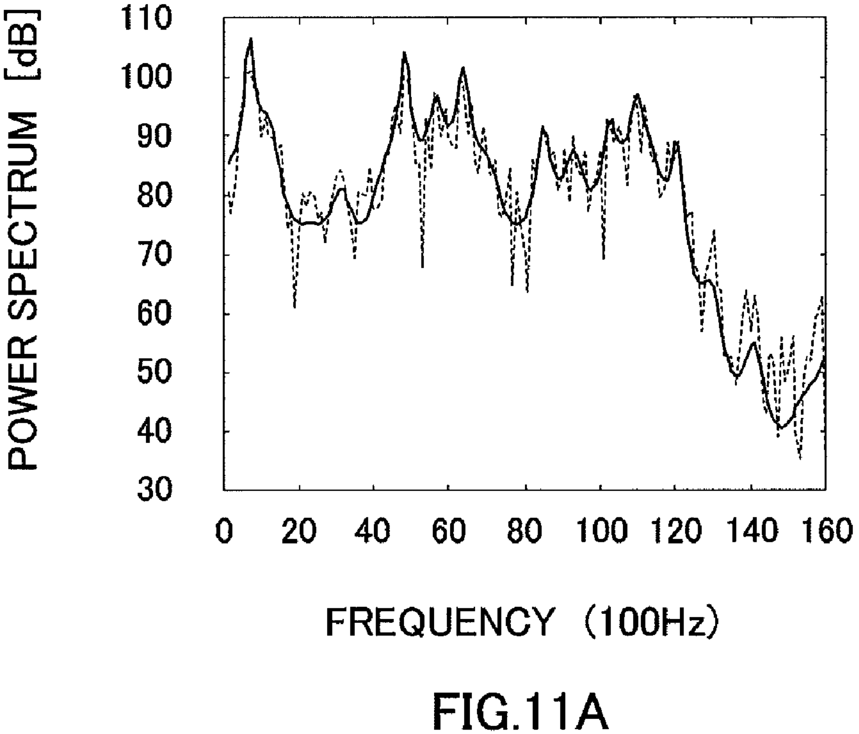
FIG. 11A is a diagram showing an example of the envelope curve of the power spectrum according to an embodiment of the present invention.
Figure 11B:
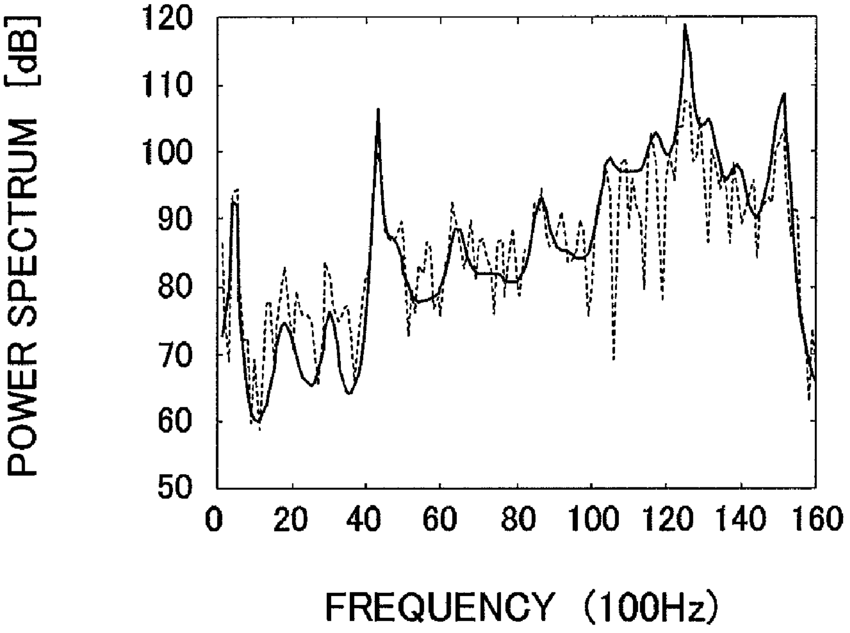
FIG. 11B is a figure showing another example of the envelope curve of the power spectrum according to an embodiment of the present invention.

In addition, the envelope curve of the power spectrum P ($P_{M'}$ or $P_{Cn}$) is obtained by plotting the transfer function H (z) of an all-pole filter. FIG. 11A and FIG. 11B are diagrams showing two examples of the power spectrum envelope curve. In FIG. 11A and FIG. 11B, the dashed line indicates the actual power spectrum of the signal, and the solid line indicates the envelope curve of the power spectrum estimated by the above-mentioned estimation method.

As described above, the present embodiment is capable of decreasing the bit rate for the multichannel system. Rather than sending a coded bit stream for each target channel, only the signal parameters of each channel are sent as additional information. The bits used for storing these signal parameters are few compared to the bits used for storing information comprising the same coded signal.

In addition, in the present embodiment, the signals are demultiplexed in to two bands. This enables adjustment of the signal parameters so as to ensure conformity with the signal characteristics of each band, thereby providing better control for restored signals. One such parameter is the LPC filter order, allowing application of a higher filter order to low band signals and a lower filter order to high band signals. Another possibility includes use of the higher filter order with quasi-periodical or steady bands, and use of the lower filter order with the bands classified as non-steady signals. In addition, because accurate power spectrum estimation leads to improvement of the signals restored, the introduction of the pitch period into parameters aids in improving the estimation of the power spectrum for steady (voiced) signals.

As general speech codec uses LPC analysis, the present embodiment generates signal parameters based on the concept of LPC. Thus the present embodiment lends itself well to a speech signal type system. Inconsequence, multichannel signal transmission system 1 of the present embodiment is suitable to applications such as a wide participation type multichannel teleconference system where each caller uses a mic or channel. Multichannel signal decoding equipment 3 of the present embodiment can output both the reference channel signal M' and the N target channel signals $C'_1$ to $C'_N$, resulting in further advantages when a means for selecting either of these and an output means for outputting the selected signal as a sound wave are provided in the equipment or in the system. That is, the receiving side audience can selectively listen to either the signal that down mixed the transmissions of all callers simultaneously (i.e., reference channel signal M'), or the signal that presents only the transmission of a specific caller (i.e., $C'_n$ of any of the N channel signals).

Furthermore, each function block used in the descriptions of the above-mentioned embodiment is representatively presented as an LSI, an integrated circuit. These may be individually developed into chips or developed into individual chips that contain the function blocks in part or in whole.

Here, the term LSI is used but, depending on the difference in the degree of integration, may be referred to as IC, system LSI, super LSI, or ultra LSI.

In addition, the means for integrated circuit development is not limited to LSI, but may be achieved using dedicated circuits or a general-purpose processor. After LSI manufacture, a field programmable gate array (FPGA) that permits programming or a reconfigurable processor that permits reconfiguration of LSI internal circuit cell connections and settings may be utilized.

Further, if the technology for developing an integrated circuit that replaces the LSI emerges as a result of the progress in semiconductor technology or another derivative technology, the function blocks may of course be integrated using that technology. The adaptation of biotechnology is a possibility.

The present application is based on Japanese Patent Application No. 2004-247404, filed on Aug. 26, 2004, the entire content of which is expressly incorporated by reference herein.

INDUSTRIAL APPLICABILITY

The multichannel signal coding equipment and multichannel signal decoding equipment of the present invention can be applied to systems that transmit multichannel speech signals or audio signals.

The invention claimed is:

1. A multichannel signal decoding equipment, comprising:

a demultiplexer that demultiplexes a coded reference signal which is generated from signals of multiple channels, and parameters multiplexed with the coded reference signal that indicate characteristics of each of the signals of the multiple channels;

a decoder that decodes the coded reference signal demultiplexed by the demultiplexer; and a generator that generates the signals of the multiple channels from the parameters demultiplexed from the decoded reference signal, the generator comprising:

a power spectrum estimator that estimates a first power spectrum for each of the signals of the multiple channels and a second power spectrum for the decoded reference signal based on the parameters; and a multiplication factor calculator that calculates a multiplication factor of the reference signal corresponding to each of the multiple channels and multiplies the reference signal by the calculated multiplication factor to generate the signals of the multiple channels, based on the first power spectrum and the second power spectrum.

2. The multichannel signal decoding equipment according to claim 1, wherein:

the demultiplexer demultiplexes the parameters including a linear predictive coding coefficient and gain from the coded reference signal; and the power spectrum estimator estimates the first power spectrum based on the coefficient and the gain.

3. The multichannel signal decoding equipment according to claim 1, wherein:

the demultiplexer demultiplexes the parameters including a pitch period from the coded reference signal; and the power spectrum estimator estimates the first power spectrum based on the pitch period.

4. The multichannel signal decoding equipment according to claim 3, wherein:

the generator further comprises a classifier that classifies each frame of the signals corresponding to the demultiplexed parameters as a voiced signal or an unvoiced signal; and the power spectrum estimator uses the coefficient and the gain to estimate the first power spectrum when the frame is classified as an unvoiced signal, or uses the coefficient, the gain, and the pitch period to estimate the first power spectrum when the frame is classified as a voiced signal.

5. The multichannel signal decoding equipment according to claim 4, wherein the classifier classifies signals based on the pitch period.

6. A multichannel signal decoding methods comprising:

demultiplexing a coded reference signal generated from signals of multiple channels, and parameters multiplexed with the coded reference signal that indicate characteristics of each of the signals of the multiple channels;

decoding the coded reference signal demultiplexed by the demultiplexing; and generating the signals of the multiple channels from the parameters demultiplexed from the decoded reference signal, the generating comprising:

estimating a first power spectrum for each of the signals of the multiple channels and a second power spectrum for the decoded reference signal based on the parameters; and calculating a multiplication factor of the decode reference signal corresponding to each of the multiple channels and multiplying the reference signal by the calculated multiplication factor to generate the signals of the multiple channels, based on the first power spectrum and the second power spectrum.

* * * * *